US008865854B2

(12) United States Patent
Garrett et al.

(10) Patent No.: US 8,865,854 B2
(45) Date of Patent: *Oct. 21, 2014

(54) METHOD OF SYNTHESIZING TUNEABLY HIGH FUNCTIONALITY IN HIGH MOLECULAR WEIGHT NATURAL OIL POLYOLS

(76) Inventors: Thomas M Garrett, Corona, CA (US); Xian Xian Du, Pittsburg, KS (US)

(*) Notice: Subject to any disclaimer, the term of this patent is extended or adjusted under 35 U.S.C. 154(b) by 0 days.

This patent is subject to a terminal disclaimer.

(21) Appl. No.: 13/374,217

(22) Filed: Dec. 16, 2011

(65) Prior Publication Data
US 2012/0116042 A1 May 10, 2012

Related U.S. Application Data

(63) Continuation-in-part of application No. 12/927,086, filed on Nov. 5, 2010.

(60) Provisional application No. 61/335,439, filed on Jan. 7, 2010.

(51) Int. Cl.
| C08G 18/42 | (2006.01) |
| C11C 3/00 | (2006.01) |
| C11C 1/04 | (2006.01) |
| C08G 18/68 | (2006.01) |
| C08G 101/00 | (2006.01) |

(52) U.S. Cl.
CPC . *C08G 18/68* (2013.01); *C11C 1/04* (2013.01); *C08G 2101/0083* (2013.01); *C08G 2101/005* (2013.01); *C08G 2101/0008* (2013.01)
USPC .......................................... 528/74.5; 554/163

(58) Field of Classification Search
CPC .................................. C08G 18/42; C11C 3/00
See application file for complete search history.

(56) References Cited

U.S. PATENT DOCUMENTS

| 2,882,249 | A | * | 4/1959 | Posnansky ................... 525/111 |
| 2,915,487 | A | * | 12/1959 | Shelley .......................... 524/598 |
| 3,485,779 | A | | 12/1969 | Gast et al. |
| 4,025,477 | A | | 5/1977 | Borden et al. |
| 4,094,838 | A | | 6/1978 | Schneider et al. |
| 4,174,329 | A | | 11/1979 | Bell et al. |
| 4,294,736 | A | * | 10/1981 | Burgess et al. ................ 554/172 |
| 4,508,853 | A | | 4/1985 | Kluth et al. |
| 4,551,517 | A | | 11/1985 | Herold et al. |
| 4,742,087 | A | | 5/1988 | Kluth et al. |
| 4,886,893 | A | | 12/1989 | Meffert et al. |
| 5,266,714 | A | * | 11/1993 | Stoll et al. ................ 252/182.18 |
| 5,302,626 | A | | 4/1994 | Hoefer et al. |
| 5,476,969 | A | | 12/1995 | Hinz et al. |
| 6,107,433 | A | | 8/2000 | Petrovic et al. |
| 6,121,398 | A | | 9/2000 | Wool et al. |
| 6,180,686 | B1 | | 1/2001 | Kurth |
| 6,433,121 | B1 | | 8/2002 | Petrovic et al. |
| 6,433,125 | B1 | | 8/2002 | Gruetzmacher et al. |
| 6,573,354 | B1 | | 6/2003 | Petrovic et al. |
| 6,686,435 | B1 | | 2/2004 | Petrovic et al. |
| 6,762,274 | B2 | | 7/2004 | Waddington et al. |
| 6,891,053 | B2 | | 5/2005 | Chasar et al. |
| 6,924,321 | B2 | | 8/2005 | Casati et al. |
| 2006/0041157 | A1 | | 2/2006 | Petrovic et al. |

OTHER PUBLICATIONS de Kraker, J.W.; Schurink, M.; Franssen, M.C.R.; Konig, W. A; de Groot, A.; and Bouwmeester, H.J.. "Hydroxylation of Sesquiterpenes by Enzymes From Chicory (*Cichorium intybus* L.) Roots." *Tetrahedron*, 59(2003), pp. 409-418.
Cirino, P.C. and Arnold, F.H.. "Regioselectivity and Activity of Cytochrome P450 BM-3 and Mutant F87A in Reactions Driven by Hydrogen Peroxide." *Advance Synthetics Catalog* 344, No. 9(2002), pp. 932-937.
Groves, J.T. and Viski, P.. "Asymmetric Hydroxylation by a Chiral Iron Porphyrin." *Journal of American Chemistry Society* 111(1989), pp. 8537-8538.
Balandrian, M. F.; Klocke, J.A.; Wurtele, E.S.; Bollinger, W.H.. "Natural Plant Chemicals: Sources of Industrial and Medicinal Materials." *Science*, 228(1985), pp. 1154-1160.
Findly, T.W.; Swern, D. and Scanlan, J.T.. "Epoxidation of Unsaturated Fatty Materials with Peracetic Acid in Glacial Acetic Acid Solution." *Journal American Chemistry Society*, vol. 67(1945), pp. 412-414.
Gast, L.E., et al. "Polyesteramides from linseed and soybean oils for protective coatings: Diisocyanate-modified polymers." Journal of the American Oil Chemists' Society, vol. 46, No. 7, Jul. 1969. Web. Jul. 8, 2009.

* cited by examiner

*Primary Examiner* — Randy Gulakowski
*Assistant Examiner* — Jeffrey Washville
(74) *Attorney, Agent, or Firm* — John C. McMahon

(57) ABSTRACT

Methods of one-pot synthesis of high molecular weight natural oil polyols having a functionality of between about 4 and about 8 are provided. The resultant polyols may be directly reacted with polyisocyanates to produce polyurethanes.

24 Claims, No Drawings

METHOD OF SYNTHESIZING TUNEABLY HIGH FUNCTIONALITY IN HIGH MOLECULAR WEIGHT NATURAL OIL POLYOLS

RELATED APPLICATIONS

This application claims benefit of U.S. Provisional Application No. 61/335,439, filed Jan. 7, 2010, and is a continuation-in-part of U.S. patent application Ser. No. 12/927,086, filed Nov. 5, 2010, the disclosures of which are hereby expressly incorporated by reference in its entirety and is hereby expressly made a portion of this application.

BACKGROUND OF THE INVENTION

The present application relates to methods of conversion of plant oils into high molecular weight natural plant oil polyols that can be used as raw materials in the manufacture of polyurethanes.

The manufacture of polyurethanes from polyisocyanates requires readily available coreactants. These coreactant materials are known in the art as polyols. Polyols may be defined as reactive substances, usually liquids, that contain at least two isocyanate-reacting groups attached to a single molecule. Such isocyanate reacting groups are also known as "active hydrogen" groups as they typically give a hydrogen atom to the isocyanate nitrogen to form a urethane. For example, an alcohol group includes an active hydrogen and reacts with isocyanate to form a urethane as shown below:

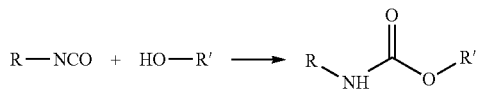

Billions of pounds of polyols are used each year to manufacture polyurethanes. Most of these polyols are polyether polyols derived from fossil fuels, typically polyethylene oxide or polypropylene oxide based polyols. As the price of oil has increased, so has the price of polyether polyols. Therefore, it has become more desirable to explore alternative sources of polyols, including agriculturally derived products such as plant oils.

Plant oils are primary metabolites of many higher plants that are economically important as sources of food and industrial oils. Chemically, plant oils are triglycerides of mixtures of fatty acids. Typically, they contain some unsaturated fatty acids. Soybean oil, for example, contains about 54 wt. % linoleic acid, 23 wt. % oleic acid, 10 wt. % palmitic acid, 8 wt. % linolenic acid and 5 wt. % stearic acid. On average, soybean oil contains 4.65 sites of unsaturation (olefin groups, carbon-carbon double bonds) per molecule. If active hydrogen functional groups, such as alcohols, are introduced into the molecule of plant oil, the product can be used as a polyol to make polyurethane.

Many plant oils, such as corn oil, soybean oil, rapeseed oil, sunflower oil, peanut oil, safflower oil, olive oil, and cotton seed oil exist in abundant supply. This abundance could yield low cost polyols if the plant oils could be functionalized with active hydrogen groups, such as alcohols, without the problems inherent in the epoxide synthetic pathway currently used in the production of most plant polyols. For example, much of the commercially available polyols made from soybean oil are manufactured in a two step process beginning with the epoxidation of soybean oil. Such process is well known in the art, and may be shown as follows:

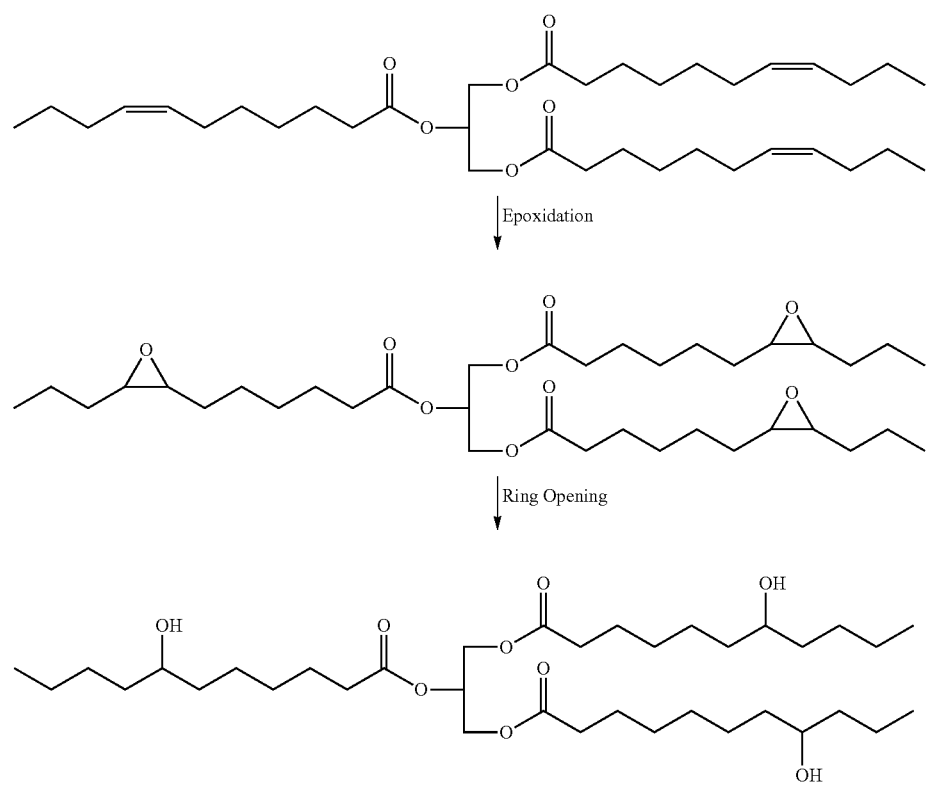

In the above-identified pathway, hydroxyl groups are introduced onto the molecule of soybean oil in the second process step by opening the oxirane of epoxidized soybean oil to form soy polyol. This may be accomplished in a variety of ways. For example, U.S. Pat. No. 2,882,249 describes the soy polyol formed by ring opening epoxidized soybean oil with ricinoleic acid. U.S. Pat. No. 4,025,477 describes the soy polyol obtained by ring opening epoxidized soybean oil with acrylic acid. U.S. Pat. Nos. 5,266,714 and 5,302,626 describe soy polyols obtained by ring opening epoxidized soybean oil with carboxylic acids. U.S. Pat. No. 6,891,053 describes the soy polyol obtained by ring opening epoxidized soybean oil with acid leached clay. U.S. Pat. Nos. 4,508,853 and 4,742,087 describe the soy polyol obtained by ring opening epoxidized soybean oil with alcohols. U.S. Pat. Nos. 6,433,125 and 4,551,517 describe soy polyols obtained by ring opening epoxidized soybean oil with higher alcohols. U.S. Pat. No. 4,886,893 describes the soy polyol obtained by ring opening epoxidized soybean oil with polyfunctional alcohols. U.S. Pat. Nos. 6,107,433, 6,433,121, 6,573,354 and 6,686,435 describe the soy polyols obtained by ring opening epoxidized soybean oil with a mixture of water, alcohol and fluoroboric acid.

Epoxidized soybean oils used to manufacture soy polyols typically have epoxide numbers of from about 4.8 to about 7.2. If the epoxide number of epoxidized soybean oil is too low, the hydroxylation reaction will give a soy polyol that contains an undesirable concentration of by-products having zero and mono hydroxy group molecules. Soy polyol containing zero and mono hydroxyl group molecules result in polyurethanes with poor physical properties. If the epoxide number of the epoxidized soybean oil is too high, the hydroxylation reaction will produce a soy polyol product that contains an undesirably large concentration of by-product having intramolecular cross-linked molecules. High concentrations of by-products containing intramolecular cross-linking unacceptably increases the viscosity of the soy polyols as well as detrimentally affecting the physical properties of the polyurethane products. It is known in the art that ring opening, for example, via hydroxylation of epoxidized plant oils, results in a variety of complex by-products, including, but not limited to intra-molecular cross-linked by-products, intermolecular cross-linked by-products, hydrolysis by-products and alcohol exchange by-products. Furthermore, even the expected or planned products of epoxidized plant oils may be poor reactors, such as secondary hydroxyl groups in the middle of fatty acid chains, which may be high in stearic hindrance.

Currently, manufacturers seeking to use plant oil polyols, such as soybean oil-derived polyols, to produce polyurethane, often must choose between inexpensive, high viscosity raw materials that are dark in color or, alternatively, expensive, low viscosity and lighter colored materials. Products from both materials may have poor physical properties that limit market acceptance. Furthermore, such poor properties may limit the overall percentage in which such materials are added to polyurethane formulations. For many uses, preferably, a plant polyol reactant would be a low cost, low viscosity and light colored raw material comparable to certain materials derived from fossil fuels. However, because of the problems inherent in the current art, such physical properties are not possible with the currently available technology at the price point desired by the market.

It is noted that it is known in the art to hydroxylate hydrocarbons by biological methods. However, to date, such processes have not proven economical in the quantities required by the market. Also, some plant oils can be used as polyols without modification. For example, castor oil contains on average about 2.7 hydroxyl groups per molecule. However, the supply of castor oil is limited and properties of polyurethanes made from such polyols (such as resilience) are not equal to those of fossil fuel derived materials.

Certain polyols may be derived from plant sources. For example polytetramethylene glycol (PTMEG) is derived from polymerizing tetrahydrofuran (THF) from corn. Such polyols yield polyurethanes with excellent physical properties and are thus superior raw materials. However, to date, the high cost of producing such polyols has resulted in limited market acceptance.

It is noted that Gast et al., U.S. Pat. No. 3,485,779 (hereafter the '779 patent) discloses reactions of hydroxylamines with triglycerides. Specifically that linseed and soybean N,N-bis-hydroxyalkyl fatty amides can be obtained by a strong base sodium methoxide catalyzed aminolysis of linseed oil and soybean oil. Such a reaction may be set forth as follows:

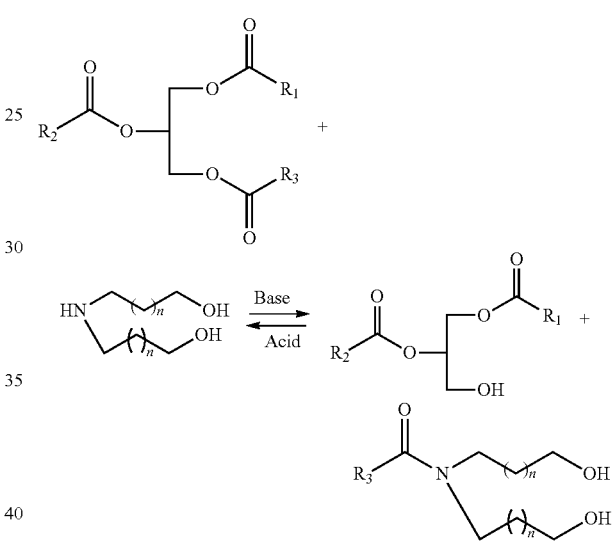

It is further noted that the '779 patent reports that reactions of that invention are inhibited by HX, thus teaching against the invention of the present application that teaches the use of HX as a catalyst in certain embodiments.

Schneider et al., U.S. Pat. No. 4,094,838 (hereafter the '838 patent) discloses soybean N,N,-bis-hydroxy ethyl fatty amide that can be used to make water-dispersible polyurethane coatings as a small molecule polyol of polyurethane resin. The '838 patent teaches diethanolamine as a preferred amidating agent in a base catalyzed aminolysis. The preferred catalyst being sodium methoxide.

Until recently, with few exceptions such as castor oil, polyols (polyfunctional alcohols) were made predominantly from fossil fuel feedstocks. The availability of fossil fuels for such feedstocks has begun to decline, creating an expanding gap between supply and demand. Such a gap can be filled by polyols from renewable resources, such as natural plant oils. Synthesizing polyols from rapidly renewable resources such as natural plant oils can both reduce demand for fossil fuels and subsidize foodstuff production by addition value to the non-protein component of beans and seeds. While many methods of manufacturing natural oil polyols, such as those described above, have become economically viable, manufacturing natural oil polyols, with both sufficiently low production costs and sufficiently high functionality, that can compete with petrochemical-based polyols has remained problematic.

Accordingly, the present invention provides a method of manufacturing novel natural oil polyols with both adjustable high functionality and adjustable high molecular weights.

SUMMARY OF THE INVENTION

In a first embodiment, a process of synthesizing a high molecular weight high functionality natural oil polyol, including the steps of forming a mixture including plant oil based unsaturated triglyceride, a cross-linking reagent, a coupling reagent and a catalyst; and reacting the mixture for a period of time of at least three hours, so as to form a high molecular weight plant oil based polyol product with a functionality of between about 4 and about 8; wherein the molecular weight of the plant oil based polyol product is associated with the concentration of the coupling reagent; and the functionality of the plant oil based polyol product is associated with the concentration of the cross-linking reagent, is provided.

In a further embodiment, reacting the mixture includes reacting the mixture in a solvent system. In a still further embodiment, reacting the mixture in a solvent system includes reacting the mixture in a solvent selected from the group consisting of benzene, toluene and combinations thereof. In a still further embodiment, reacting the mixture in a solvent system includes reacting the mixture at a temperature of at least boiling temperature.

In a further embodiment, reacting the mixture includes reacting the mixture in a solvent-free system. In a still further embodiment, reacting the mixture in a solvent-free system includes reacting the mixture in the presence of a vacuum. In a still further embodiment, reacting the mixture in a solvent-free system includes reacting the mixture at a temperature of between about 50° C. and about 200° C. or higher. In a still further embodiment, reacting the mixture in a solvent-free system includes reacting the mixture at a temperature selected from the group consisting of 50° C., 75° C., 80° C., 85° C., 90° C., 95° C., 100° C., 105° C., 110° C., 115° C., 120° C., 125° C., 130° C., 135° C., 140° C., 145° C., 150° C., 155° C., 160° C., 165° C., 170° C., 175° C., 180° C., 185° C., 190° C., 195° C., 200° C., 205° C., 210° C., 215° C., 220° C. and 225° C.

In a further embodiment, reacting the mixture for a period of time includes reacting the mixture for a period of time of between about 3-hours and about 80-hours.

In a further embodiment, the coupling reagent is selected from the group consisting of linear coupling reagents, cross-coupling reagents, and combinations thereof. In a still further embodiment, the linear coupling reagent is selected from the group consisting of dicarboxylic acids, dicarboxylic anhydrides, and combinations thereof. In a still further embodiment, the cross-coupling reagent is selected from the group consisting of tricarboxylic acids, tetracarboxylic acids, tetracarboxylic dianhydrides, and combinations thereof. In a still further embodiment, the coupling reagent is selected from the group consisting of maleic acid, maleic anhydride, succinic acid, succinic anhydride, glutaric acid, glutaric anhydride, phthalic acid, phthalic anhydride, fumaric acid, pimelic acid, suberic acid, azelaic acid, sebacic acid, isophthalic acid, terephthalic acid, traumatic acid, muconic acid, adipic acid, tricarboxylic acid, citric acid, aconitic acid, carballylic acid, trimesic acid, 1,1,2,3-ethanetetracarboxylic acid, 1,2,3,4-propanetetracarboxylic acid, 1,1,4,4-butanetetracarboxylic acid, 1,2,3,4-butanetetracarboxylic acid, 1,2,3,4-butanetetracarboxylic dianhydride, 1,2,4,5-tetracarboxybenzene, 1,2,3,5-tetracarboxybenzene, 1,2,4,5-tetracarboxybenzene, benzene-1,2,4,5-tetracarboxylic dianhydride, 1,4,5,8-naphthalenetetracarboxylic dianhydride and combinations thereof.

In a further embodiment, the cross-linker reagent is a small molecular weight polyfunctional molecule. In a still further embodiment, the cross-linker reagent is a small molecular weight polyfunctional molecule selected from the group consisting of polyols, polythiols, and polyamines containing 4, 5, 6, 7, 8, 9, or more active hydrogen functional groups, and a combination thereof. In a still further embodiment, the cross-linker reagent is selected from the group consisting of pentaerythritol, pentaerythritol propoxylate, pentaerythritol ethoxylate, pentaerythritol tetrakis(3-mercaptopropionate), arabinose, arabitol, dipentaerythritol, sorbitol, β-lactose, D-lactitol, matitol, and combinations thereof.

In a further embodiment, the catalyst is selected from the group consisting of organic acids and inorganic acids, and combinations thereof. In a still further embodiment, the catalyst is selected from the group consisting of p-toluenesulfonic acid, methanesulfonic acid, sulfuric acid and phosphoric acid, and combinations thereof.

In a further embodiment, the plant oil based triglyceride is selected from the group consisting of a corn oil, soybean oil, rapeseed oil, sunflower oil, sesame seed oil, peanut oil, safflower oil, olive oil, cotton seed oil, linseed oil, walnut oil, tung oil and combinations thereof. In a still further embodiment, the plant oil based triglyceride is a soybean oil based triglyceride.

In a second embodiment, a high molecular weight high functionality plant oil based polyol synthesized according to the process of forming a mixture including plant oil based unsaturated triglyceride, a cross-linking reagent, a coupling reagent and a catalyst; and then reacting the mixture for a period of time of at least three hours, so as to form a high molecular weight high functionality plant oil based polyol product; wherein the molecular weight of the plant oil based polyol product is associated with the concentration of the coupling reagent; and the functionality of the plant oil based polyol product is associated with the concentration of the cross-linking reagent, is provided.

In a further embodiment, the polyol is a soybean oil based polyol.

In a third embodiment, a process of preparing a polyurethane including the steps of reacting at least one high molecular weight high functionality plant oil based polyol synthesized by the process of a high molecular weight high functionality plant oil based polyol synthesized according to the process of forming a mixture including plant oil based unsaturated triglyceride, a cross-linking reagent, a coupling reagent and a catalyst; and then reacting the mixture for a period of time of at least three hours, so as to form a high molecular weight plant oil based polyol product with a functionality of between about 4 and about 8; wherein the molecular weight of the plant oil based polyol product is associated with the concentration of the coupling reagent; and the functionality of the plant oil based polyol product is associated with the concentration of the cross-linking reagent, with at least one of an aromatic isocyanate, an aliphatic isocyanate and an isocyanate terminated pre-polymer, so as to form a polyurethane.

In a further embodiment, polyurethane according to the process of including the steps of reacting at least one high molecular weight high functionality plant oil based polyol synthesized by the process of a high molecular weight high functionality plant oil based polyol synthesized according to the process of forming a mixture including plant oil based unsaturated triglyceride, a cross-linking reagent, a coupling reagent and a catalyst; and then reacting the mixture for a period of time of at least three hours, so as to form a high molecular weight plant oil based polyol product with a functionality of between about 4 and about 8; wherein the molecular weight of the plant oil based polyol product is associated with the concentration of the coupling reagent; and the functionality of the plant oil based polyol product is associated with the concentration of the cross-linking reagent, with at least one of an aromatic isocyanate, an aliphatic isocyanate and an isocyanate terminated pre-polymer, so as to form a polyurethane, is provided.

OBJECTS OF THE INVENTION

Not all objects apply to all embodiments. One object of the present invention is to provide a method of coupling renewable plant oil based polyols, so as to produce a higher molecular weight polyol that subsequently can be used for the synthesis of bio-based or plant oil based polyurethanes. Another object of the present invention is to provide low cost bio-based polyols with increased reactivity, lower color and less steric hindrance than other polyols.

Other objects and advantages of this invention will become apparent from the following description that sets forth, by way of illustration and example, certain embodiments of this invention.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention.

It is believed the chemistry disclosed in the present application can be applied to synthetic oils, fossil fuel and derived oils, and oils from genetically engineered plants, as well as naturally occurring plant oils and blends of any of the above oils, as long as such oils include carbon-carbon double bonds on which to carry out the reaction. Also, homologue derivatives of plant polyols according to the invention are possible. For example, polyols of the invention may be ethoxylated or propoxylated to further resemble fossil fuel polyols.

Plant oil based polyols, or natural oil or plant oil polyols, can be coupled or joined together, so as to synthesize a natural oil polyol having a high molecular weight, known in the art as low hydroxyl value or number. Preferably, the molecular weight of the high molecular weight, or coupled, polyol is greater than about 800, and more preferably in a range of about 2,000 to about 20,000, and the hydroxyl value (OH#) is 150 or less.

In an embodiment according to the invention, a process of coupling plant oil based polyols to produce a high molecular weight natural oil polyol product is provided, including the steps of forming a mixture of a plant oil based polyol reagent and a coupling reagent; and then reacting the mixture at a temperature of from about 100° F. to about 250° F. while simultaneously removing water from the mixture for a period of from about 3-hours to about 24-hours or more, so as to form a high molecular weight plant oil polyol product with a hydroxyl number, or hydroxyl value, of between about 50 and 60. In some embodiments, the high molecular weight natural oil polyol includes a hydroxyl number of between about 5.0 and 60.

The coupling reaction is reversible. Further, water is one of the reaction products. In order to drive the reaction towards completion of the coupling reaction, the water is removed while the reaction is proceeding. This can be done using a variety of methods known in the art. For example, the water may be removed from the mixture by refluxing the mixture over a Dean-Stark trap. In another example, the water may be removed from the mixture by reacting the mixture under a vacuum, as the hot reaction makes the water easily volatile, especially in a vacuum. Additional suitable methods are known in the art.

Numerous natural plant oil, or plant oil based, polyols are suitable polyol reagents for the synthesis of the high molecular weight plant oil polyol, including but not limited to corn oil polyol, soybean oil polyol, rapeseed oil polyol, sunflower oil polyol, sesame seed oil polyol, peanut oil polyol, safflower oil polyol, olive oil polyol, cotton seed oil polyol, linseed oil polyol, walnut oil polyol, tung oil polyol and combinations thereof.

In one embodiment, the high molecular weight natural plant oil polyol includes a soybean oil based polyol reagent having a hydroxyl value (OH#), or hydroxyl number, of 150. In another embodiment, the soybean oil based polyol reagent has a hydroxyl value (OH#) of less than 150.

The polyol reagent may be synthesized using any method disclosed herein. In preferred embodiments, the polyol reagent is a soybean oil based polyol synthesized in one step, according to the reaction scheme described above. After synthesis, the plant oil polyols, or the polyol reagent, are coupled together using a coupling reagent, according to the reaction scheme I, below:

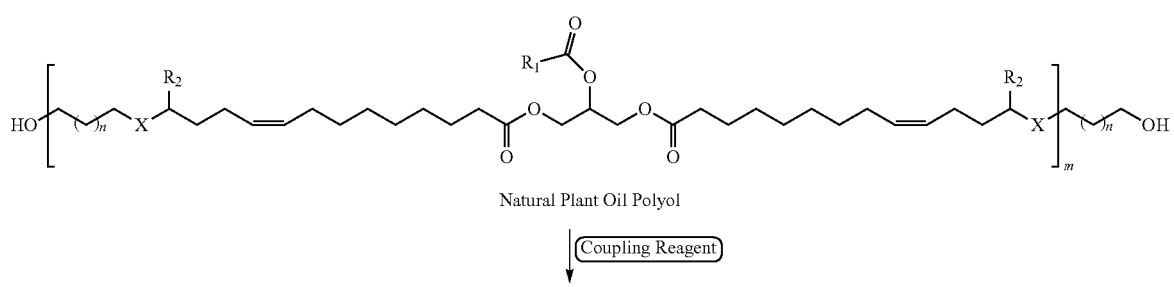

Natural Plant Oil Polyol

I

-continued

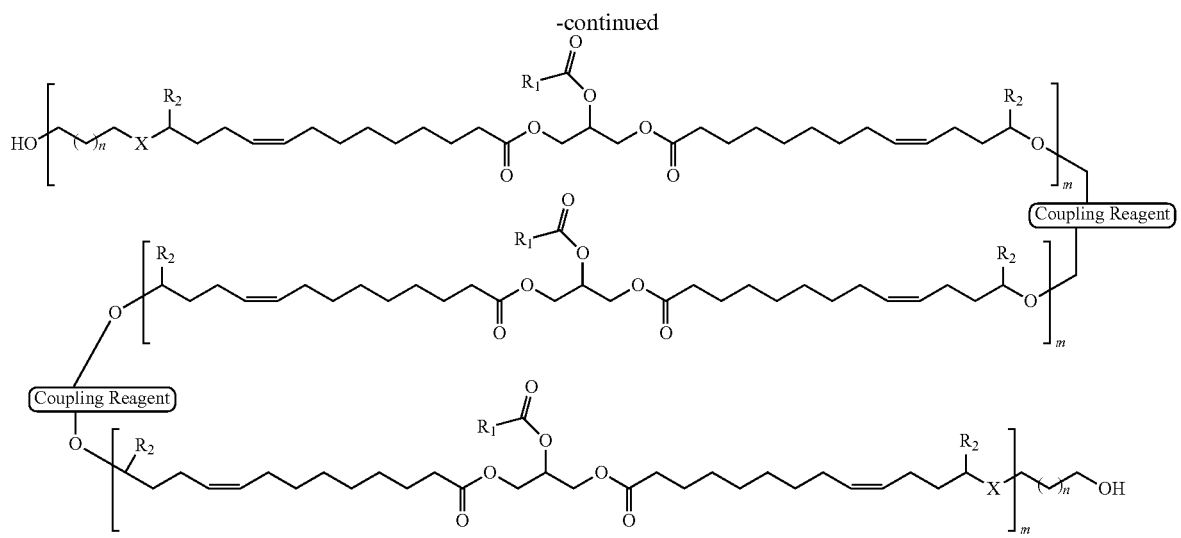

Numerous coupling reagents, agents or reactants may be used. In some embodiments, the coupling reagent is a carboxylic acid free acid or an anhydride of the acid. For example, the coupling reagent may be a dicarboxylic acid, a polycarboxylic acid, such as a tricarboxylic acid, or a combination thereof. In other examples, the coupling reagent may be an anhydride of the dicarboxylic or polycarboxylic acid. Preferably, the coupling reagent is an anhydride of an aliphatic dicarboxylic acid or an aromatic dicarboxylic acid, or a di- or tricarboxylic free acid. When the coupling reagent is a dicarboxylic or polycarboxylic acid, or an anhydride thereof, the high molecular weight polyol produced is a polyester polyol.

Some exemplary dicarboxylic acid anhydride coupling reagents include but are not limited to ethanedioic acid anhydride, propanedioic acid anhydride, butanedioic acid anhydride, pentanedioic acid anhydride, hexanedioic acid anhydride, heptanedioic acid anhydride, octanedioic acid anhydride, nonanedioic acid anhydride, decanedioic acid anhydride, benzene-1,2-dicarboxylic acid anhydride, o-phthalic acid benzene-1,3-dicarboxylic acid anhydride, m-phthalic acid benzene-1,4-dicarboxylic acid anhydride, p-phthalic acid anhydride, and combinations thereof.

In some other embodiments, the coupling reagent is a poly-alcohol. For example, coupling reagent may be a diol, a triol, a qaurtol, and combinations thereof. When the coupling reagent is a poly-alcohol, the high molecular weight polyol produced is an ether polyol.

The coupling reaction is acid catalyzed. Thus, the coupling reaction is performed in the presence of an acid. Suitable acid catalysts include, but are not limited to, phosphoric acid, sulfuric acid, p-toluensulfonic acid and methanesulfonic acid.

The coupling reaction is performed under vacuum and at a temperature of about 100° F., 105° F., 110° F., 115° F., 120° F., 125° F., 130° F., 135° F., 140° F., 145° F., 150° F., 155° F., 160° F., 165° F., 170° F., 175° F., 180° F., 185° F., 190° F., 195° F., 200° F., 205° F., 210° F., 215° F., 220° F., 225° F., 230° F., 235° F., 240° F., 245° F., 250° F., 255° F. or higher. In some circumstances, the reaction temperature is optimized for at least one of the reaction components, the reaction volume, and the reaction vessel. In some circumstances, the reaction is performed under a nitrogen gas blanket.

The coupling reaction is performed for a period of from about 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13.0, 13.5, 14, 14.5, 15, 15.5, 16, 16.5, 17, 17.5, 18, 18.5, 19, 19.5, 20, 20.5, 21, 21.5, 22, 22.5, 23, 23.5, or 24-hours or longer. In some circumstances, the reaction time is optimized for at least one of the reaction components, the reaction volume, and the reaction vessel. For example, longer reactions times, such as but not limited to 1, 2, 3, 4, 5, 6, 7, 8, 9, 10, 11, 12, 13, or 14-days may be required for larger-scale or industrial-scale reaction volumes, such as is known in the art.

In some embodiments, additional processing of the reaction mixture improves the amount and/or quality of the reaction product. For example, in some circumstances, the reaction mixture may be refluxed, extracted, distilled or the like.

In preferred embodiments, the coupled plant oil polyols may be used to synthesize plant oil based polyurethanes, such as is described elsewhere herein. Often, coupled plant oil polyol is a soybean oil based coupled polyol, wherein the polyol(s) has a hydroxyl number of from about 50 to about 60. For example, suitable soybean oil based polyols for use in the coupling reaction have a hydroxyl number of about 50, 51, 52, 53, 54, 55, 56, 57, 58, 59 or 60.

The following examples of compositions according to the invention are provided for illustration. Any parts and percentages are by weight of the composition unless otherwise indicated.

Example 1

| Component | Amount (grams) |
| --- | --- |
| Soybean oil | 99.79 |
| Iodine | 0.17 |
| Diethanolamine | 10.78 |
| Maleic anhydride | 9.15 |
| Phosphorus pentoxide | 0.10 |
| Diphenylmethane diisocyanate | 2.70 |

The above amounts of diethanolamine and iodine were added to the above amount of soybean oil with stirring. The mixture was stirred for 23 hours at a temperature between about 195° F. (90° C.) and about 236° F. (113° C.). Then the above amounts of maleic anhydride and phosphorus pentoxide were added. The mixture was stirred for 22 hours at between about 195° F. (90° C.) and about 236° F. (113° C.) and under vacuum, then cooled to room temperature to give about 119.90 grams clear liquid soybean oil-polyol with a hydroxyl number of 58. An amount of 20.00 grams of the reaction product was then reacted with the above disclosed amount of diphenylmethane diisocyanate, yielding a solid polyurethane material based upon soybean oil.

Example 2

| Component | Amount (grams) |
| --- | --- |
| Soybean oil | 129.86 |
| Iodine | 0.23 |
| Diethanolamine | 14.03 |
| Maleic anhydride | 15.72 |
| Phosphoric acid | 0.16 |
| Diphenylmethane diisocyanate | 00.90 |

The above amounts of diethanolamine and iodine were added to the above amount of soybean oil with stirring. The mixture was stirred for 24 hours at a temperature between about 120° F. and about 225° F. Then, the above amounts of maleic anhydride and phosphoric acid were added with stirring. The second mixture was stirred for 22 hours under vacuum, at a temperature between about 120° F. and about 225° F., then cooled to room temperature to give a liquid soy polyol with a hydroxyl number of 38. A reaction mixture of about 10.00 grams of the soybean oil based polyol with the above amount of diphenylmethane diisocyanate yielded a solid soybean oil based polyurethane material.

Example 3

| Component | Amount (grams) |
| --- | --- |
| Soybean oil | 132.89 |
| Iodine crystal | 0.23 |
| Diethanolamine | 14.36 |
| Maleic anhydride | 12.36 |
| Phosphoric acid | 0.16 |
| Diphenylmethane diisocyanate | 1.35 |

The above amounts of diethanolamine and iodine were added to the above amount of soybean oil with stirring. The mixture was stirred for 23 hours at a temperature between about 190° F. and about 226° F. Then, the above amounts of maleic anhydride and phosphoric acid were added with stirring. The mixture was stirred under vacuum for 24 hours at between about 190° F. and about 226° F. to give a liquid soybean oil based polyol with a hydroxyl number of 57. A reaction mixture of about 10.00 grams of the polyol and the above indicated amount of diphenylmethane diisocyanate yielded a solid soybean oil based polyurethane material.

Example 4

| Component | Amount (grams) |
| --- | --- |
| Soybean oil | 116.16 |
| Iodine crystal | 0.20 |
| Diethanolamine | 12.55 |
| Maleic anhydride | 10.97 |
| Phosphoric acid | 0.16 |
| Diphenylmethane diisocyanate | 1.30 |

The above amounts of diethanolamine and iodine were added to the above amount of soybean oil with stirring. The mixture was stirred for 23 hours at a temperature between about 180° F. and about 225° F. Then, the above amounts of maleic anhydride and phosphoric acid were added with stirring. The mixture was stirred under vacuum for 23 hours at between about 190° F. and about 226° F. to give a liquid soybean oil based polyol with a hydroxyl number of 54. A reaction mixture of about 10.00 grams of the polyol and the above indicated amount of diphenylmethane diisocyanate yielded a solid soybean oil based polyurethane material.

Example 5

| Component | Amount (grams) |
| --- | --- |
| Soybean oil | 124.64 |
| Iodine crystal | 0.22 |
| Diethanolamine | 13.47 |
| Maleic anhydride | 21.56 |
| Toluene | 200.00 |
| Sulfuric acid | 0.12 |
| Diphenylmethane diisocyanate | 1.26 |

The above amounts of diethanolamine and iodine were added to the above amount of soybean oil with stirring. The mixture was stirred for 22 hours at a temperature between about 180° F. and about 225° F. Then, the above amounts of maleic anhydride, toluene and sulfuric acid were added with stirring. The mixture was refluxed for 6 hours using a Dean-Stark distilling trap, then distilled out of solvent to give a liquid soybean oil based polyol with a hydroxyl number of 50. A reaction mixture of about 10.00 grams of the polyol and the above indicated amount of diphenylmethane diisocyanate yielded a solid soybean oil based polyurethane material.

Example 6

| Component | Amount (grams) |
| --- | --- |
| Soybean oil | 124.18 |
| Iodine crystal | 0.22 |
| Diethanolamine | 13.42 |
| Maleic anhydride | 12.03 |
| Toluene | 200.00 |
| Phosphoric acid | 0.15 |
| Diphenylmethane diisocyanate | 1.28 |

The above amounts of diethanolamine and iodine were added to the above amount of soybean oil with stirring. The mixture was stirred for 23 hours at a temperature between about 180° F. and about 227° F. Then, the above amounts of maleic anhydride, toluene and phosphoric acid were added with stirring. The mixture was refluxed for 8 hours using a Dean-Stark distilling trap, then distilled out of solvent to give a liquid soybean oil based polyol with a hydroxyl number of 52. A reaction mixture of about 10.00 grams of the polyol and the above indicated amount of diphenylmethane diisocyanate yielded a solid soybean oil based polyurethane material.

Example 7

| Component | Amount (grams) |
| --- | --- |
| Soybean oil | 132.75 |
| Iodine crystal | 0.23 |
| Diethanolamine | 14.35 |
| Maleic anhydride | 12.54 |
| Phosphoric acid | 0.13 |
| Diphenylmethane diisocyanate | 1.32 |

The above amounts of diethanolamine and iodine were added to the above amount of soybean oil with stirring. The mixture was stirred for 24 hours at a temperature between about 190° F. and about 225° F. Then, the above amounts of maleic anhydride and phosphoric acid were added with stirring. The mixture was stirred for 10 hours at a temperature of about 240° F. under vacuum to give a liquid soybean oil based polyol with a hydroxyl number of 54. A reaction mixture of about 10.00 grams of the polyol and the above indicated amount of diphenylmethane diisocyanate yielded a solid soybean oil based polyurethane material.

Example 8

| Component | Amount (grams) |
| --- | --- |
| Soybean oil | 149.34 |
| Iodine crystal | 0.26 |
| Diethanolamine | 16.14 |
| Maleic anhydride | 14.11 |
| Phosphoric acid | 0.15 |
| Diphenylmethane diisocyanate | 1.30 |

The above amounts of diethanolamine and iodine were added to the above amount of soybean oil with stirring. The mixture was stirred for 24 hours at a temperature between about 190° F. and about 225° F. Then, the above amounts of maleic anhydride and phosphoric acid were added with stirring. The mixture was stirred for 5 hours at a temperature of about 255° F. under vacuum to give a liquid soybean oil based polyol with a hydroxyl number of 52. A reaction mixture of about 10.00 grams of the polyol and the above indicated amount of diphenylmethane diisocyanate yielded a solid soybean oil based polyurethane material.

Example 9

| Component | Amount (grams) |
| --- | --- |
| Soybean oil | 165.98 |
| Iodine crystal | 0.29 |
| Diethanolamine | 17.94 |
| Maleic anhydride | 15.68 |
| Phosphoric acid | 0.11 |
| Diphenylmethane diisocyanate | 1.29 |

The above amounts of diethanolamine and iodine were added to the above amount of soybean oil with stirring. The mixture was stirred for 24 hours at a temperature between about 190° F. and about 226° F. Then, the above amounts of maleic anhydride and phosphoric acid were added with stirring. The mixture was stirred for 4 hours at a temperature of about 240° F. under vacuum to give a liquid soybean oil based polyol with a hydroxyl number of 51. A reaction mixture of about 10.00 grams of the polyol and the above indicated amount of diphenylmethane diisocyanate yielded a solid soybean oil based polyurethane material.

Example 10

| Component | Amount (grams) |
| --- | --- |
| Soybean oil | 165.98 |
| Iodine crystal | 0.29 |
| Diethanolamine | 17.94 |
| Maleic anhydride | 15.68 |
| Phosphoric acid | 0.11 |
| Diphenylmethane diisocyanate | 1.29 |

The above amounts of diethanolamine and iodine were added to the above amount of soybean oil with stirring. The mixture was stirred for 24 hours at a temperature between about 190° F. and about 226° F. Then, the above amounts of maleic anhydride and phosphoric acid were added with stirring. The mixture was stirred for 4 hours at a temperature of about 240° F. under vacuum to give a liquid soybean oil based polyol with a hydroxyl number of 51. A reaction mixture of about 10.00 grams of the polyol and the above indicated amount of diphenylmethane diisocyanate yielded a solid soybean oil based polyurethane material.

Example 11

| Component | Amount (grams) |
| --- | --- |
| Soybean oil | 125.32 |
| Iodine crystal | 0.23 |
| Diethanolamine | 17.45 |
| Maleic anhydride | 16.89 |
| Phosphoric acid | 0.12 |
| Diphenylmethane diisocyanate | 1.28 |

The above amounts of diethanolamine and iodine were added to the above amount of soybean oil with stirring. The mixture was stirred for 24 hours at a temperature between about 200° F. and about 227° F. Then, the above amounts of maleic anhydride and phosphoric acid were added with stirring. The mixture was stirred for 24 hours at a temperature between about 200° F. and about 227° F. under vacuum to give a liquid soybean oil based polyol with a hydroxyl number of 54. A reaction mixture of about 10.00 grams of the polyol and the above indicated amount of diphenylmethane diisocyanate yielded a solid soybean oil based polyurethane material.

Example 12

| Component | Amount (grams) |
| --- | --- |
| Soybean oil | 140.99 |
| Iodine crystal | 0.25 |
| Diethanolamine | 17.45 |
| Maleic anhydride | 19.00 |
| Toluene | 200.00 |
| Sulphuric acid | 0.13 |
| Diphenylmethane diisocyanate | 1.25 |

The above amounts of diethanolamine and iodine were added to the above amount of soybean oil with stirring. The mixture was stirred for 22 hours at a temperature between about 180° F. and about 225° F. Then, the above amounts of maleic anhydride, toluene and sulfuric acid were added with stirring. The mixture was refluxed for 8 hours using a Dean-Stark distilling trap, then distilled out of solvent to give a liquid soybean oil based polyol with a hydroxyl number of 53. A reaction mixture of about 10.00 grams of the polyol and the above indicated amount of diphenylmethane diisocyanate yielded a solid soybean oil based polyurethane material.

Example 13

| Component | Amount (grams) |
|---|---|
| Soybean oil | 148.76 |
| Iodine crystal | 0.27 |
| Diethanolamine | 20.71 |
| Maleic anhydride | 20.05 |
| Toluene | 200.00 |
| p-Toluenesulphonic acid | 0.22 |
| Diphenylmethane diisocyanate | 1.24 |

The above amounts of diethanolamine and iodine were added to the above amount of soybean oil with stirring. The mixture was stirred for 22 hours at a temperature between about 180° F. and about 228° F. Then, the above amounts of maleic anhydride, toluene and p-toluenesulphonic acid were added with stirring. The mixture was refluxed for 10 hours using a Dean-Stark distilling trap, then distilled out of solvent to give a liquid soybean oil based polyol with a hydroxyl number of 54. A reaction mixture of about 10.00 grams of the polyol and the above indicated amount of diphenylmethane diisocyanate yielded a solid soybean oil based polyurethane material.

Example 14

| Component | Amount (grams) |
|---|---|
| Soybean oil | 157.99 |
| Iodine crystal | 0.28 |
| Diethanolamine | 17.07 |
| Maleic anhydride | 14.48 |
| p-Toluenesulphonic acid | 0.18 |
| Diphenylmethane diisocyanate | 1.26 |

The above amounts of diethanolamine and iodine were added to the above amount of soybean oil with stirring. The mixture was stirred for 24 hours at a temperature between about 200° F. and about 226° F. Then, the above amounts of maleic anhydride and p-toluenesulphonic acid were added with stirring. The mixture was stirred under vacuum for 20 hours at a temperature between about 200° F. and about 226° F. to give a liquid soybean oil based polyol with a hydroxyl number of 55. A reaction mixture of about 10.00 grams of the polyol and the above indicated amount of diphenylmethane diisocyanate yielded a solid soybean oil based polyurethane material.

Example 15

| Component | Amount (grams) |
|---|---|
| Soybean oil | 164.23 |
| Iodine crystal | 0.29 |
| Diethanolamine | 17.75 |
| Maleic anhydride | 16.57 |
| Methylpropane diol | 0.97 |
| Phosphoric acid | 0.20 |
| Diphenylmethane diisocyanate | 1.25 |

The above amounts of diethanolamine and iodine were added to the above amount of soybean oil with stirring. The mixture was stirred for 23 hours at a temperature between about 200° F. and about 226° F. Then, the above amounts of maleic anhydride, methylpropane diol, and phosphoric acid were added with stirring. The mixture was stirred under vacuum for 8 hours at a temperature between about 200° F. and about 230° F. to give a liquid soybean oil based polyol with a hydroxyl number of 53. A reaction mixture of about 10.00 grams of the polyol and the above indicated amount of diphenylmethane diisocyanate yielded a solid soybean oil based polyurethane material.

Example 16

| Component | Amount (grams) |
|---|---|
| Soybean oil | 172.52 |
| Iodine crystal | 0.30 |
| Diethanolamine | 18.64 |
| Maleic anhydride | 17.40 |
| Methylpropane diol | 1.02 |
| Phosphoric acid | 0.12 |
| Diphenylmethane diisocyanate | 1.25 |

The above amounts of diethanolamine and iodine were added to the above amount of soybean oil with stirring. The mixture was stirred for 23 hours at a temperature between about 200° F. and about 227° F. Then, the above amounts of maleic anhydride, methylpropane diol, and phosphoric acid were added with stirring. The mixture was stirred under vacuum for 5 hours at a temperature between about 200° F. and about 235° F. to give a liquid soybean oil based polyol with a hydroxyl number of 53. A reaction mixture of about 10.00 grams of the polyol and the above indicated amount of diphenylmethane diisocyanate yielded a solid soybean oil based polyurethane material.

Example 17

| Component | Amount (grams) |
|---|---|
| Soybean oil | 160.73 |
| Iodine crystal | 0.28 |
| Diethanolamine | 17.37 |
| Maleic anhydride | 18.13 |
| Diethylene glycol | 3.19 |
| P-Toluenesulfonic acid | 0.30 |
| Diphenylmethane diisocyanate | 1.26 |

The above amounts of diethanolamine and iodine were added to the above amount of soybean oil with stirring. The mixture was stirred for 23 hours at a temperature between about 210° F. and about 226° F. Then, the above amounts of maleic anhydride, diethylene glycol, and p-toluenesulfonic acid were added with stirring. The mixture was stirred under vacuum for 8 hours at a temperature between about 210° F. and about 230° F. to give a liquid soybean oil based polyol with a hydroxyl number of 55. A reaction mixture of about 10.00 grams of the polyol and the above indicated amount of diphenylmethane diisocyanate yielded a solid soybean oil based polyurethane material.

Example 18

| Component | Amount (grams) |
|---|---|
| Soybean oil | 163.60 |
| Iodine crystal | 0.29 |
| Diethanolamine | 17.68 |
| Maleic anhydride | 16.50 |
| Diethylene glycol | 1.62 |
| P-Toluenesulfonic acid | 0.31 |
| Diphenylmethane diisocyanate | 1.25 |

The above amounts of diethanolamine and iodine were added to the above amount of soybean oil with stirring. The mixture was stirred for 23 hours at a temperature between about 210° F. and about 225° F. Then, the above amounts of maleic anhydride, diethylene glycol, and p-toluenesulfonic acid were added with stirring. The mixture was stirred under vacuum for 5 hours at a temperature between about 215° F. and about 235° F. to give a liquid soybean oil based polyol with a hydroxyl number of 54. A reaction mixture of about 10.00 grams of the polyol and the above indicated amount of diphenylmethane diisocyanate yielded a solid soybean oil based polyurethane material.

In another embodiment, a novel method of converting plant oils into adjustable high functionality and adjustable high molecular weight natural oil polyols is provided. High molecular weight natural plant oil polyols with a tunable functionality of between about 4 and about 8 are provided. High molecular weight natural plant oil polyols with a tunable functionality of less than 4 and greater than 8 are also provided. These polyols can be used as raw materials in the manufacture of polyurethanes, such as but not limited to polyurethane foams and elastomers.

It is noted that, in the majority of formulations, a blend of both polyol functionalities and molecular weights are required to obtain the desired properties in the resulting polyurethane. Accordingly, it is common in the art to blend polyols in the finished formulation both to tune in the desired functionality and to reach a broader distribution of molecular weights. Natural oil polyols have an advantage over petrochemical based polyols, because natural oil polyols naturally have a broader molecular weight distribution, known as polydispersivity in the art, than petrochemical based polyols. Since the method of the present invention provides for tuning the functionality of the natural oil polyol molecules to any desired average, much of this blending can be eliminated with natural oil polyols. Eliminating some or all of such blending may dramatically simplify the work of the formulator and provide a competitive advantage for natural oil polyols over fossil fuel polyols.

In another embodiment according to the invention, a process of synthesizing, in a single reaction vessel, a natural oil polyol with a tuneably high molecular weigh and a tuneably high functionality is provided according to the reaction scheme II, below, in which soybean oil is used as an exemplary natural plant oil:

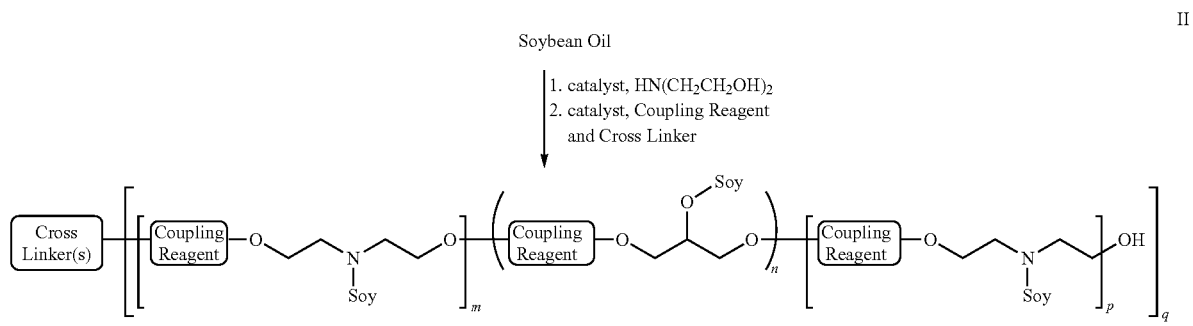

II

As shown in reaction scheme II, the natural plant oil (e.g., soybean oil) is first hydroxylated, such as by reacting the natural plant oil with diethanolamine in the presence of a catalyst. Then, the hydroxylated plant oil is coupled in the presence of one or more cross-linkers, a coupling reagent and a catalyst. The reaction product is the high molecular weight high functionality natural plant oil based polyol of the present invention.

While soybean oil is used as an exemplary starting reagent in reaction scheme II, numerous natural plant oils are suitable for the synthesis of the high molecular weight high functionality plant oil polyol of the present invention, including but not limited to corn oil, soybean oil, rapeseed oil, sunflower oil, sesame seed oil, peanut oil, safflower oil, olive oil, cotton seed oil, linseed oil, walnut oil, tung oil and combinations thereof.

The catalyst is either an organic acid, such as but not limited to p-toluenesulfonic acid, or an inorganic acid, such as but not limited to sulfuric acid and phosphoric acid.

Numerous coupling reagents are suitable for synthesis of the high molecular weight high functionality plant oil polyol. Generally, the coupling reagent is either a linear coupling reagent or a cross-coupling reagent. However, combinations of both linear and cross-coupling reagents are used in some embodiments. Suitable linear coupling reagent include but are not limited to dicarboxylic acids, dicarboxylic anhydrides, and combinations thereof. Suitable cross-coupling reagent include but are not limited to tricarboxylic acids, tetracarboxylic acids, tetracarboxylic dianhydrides, and combinations thereof.

In some embodiments, the coupling reagent is selected from the group consisting of maleic acid, maleic anhydride, succinic acid, succinic anhydride, glutaric acid, glutaric anhydride, phthalic acid, phthalic anhydride, fumaric acid, pimelic acid, suberic acid, azelaic acid, sebacic acid, isophthalic acid, terephthalic acid, traumatic acid, muconic acid, adipic acid, tricarboxylic acid, citric acid, aconitic acid, carballylic acid, trimesic acid, 1,1,2,3-ethanetetracarboxylic acid, 1,2,3,4-propanetetracarboxylic acid, 1,1,4,4-butanetetracarboxylic acid, 1,2,3,4-butanetetracarboxylic acid, 1,2,3,4-butanetetracarboxylic dianhydride, 1,2,4,5-tetracarboxybenzene, 1,2,3,5-tetracarboxybenzene, 1,2,4,5-tetracarboxybenzene, benzene-1,2,4,5-tetracarboxylic dianhydride, 1,4,5,8-naphthalenetetracarboxylic dianhydride and combinations thereof.

In some embodiments, the cross-linker or cross-linker reagent is a small molecular weight polyfunctional molecule, such as but not limited to a polyol, a polythiol, or a polyamine containing 4, 5, 6, 7, 8, 9, or more active hydrogen functional groups, or a combination thereof. In an exemplary embodiment, the cross-linker is selected from the group consisting of pentaerythritol, pentaerythritol propoxylate, pentaerythritol ethoxylate, pentaerythritol tetrakis(3-mercaptopropionate), arabinose, arabitol, dipentaerythritol, sorbitol, β-lactose, D-lactitol, matitol, and combinations thereof.

Synthesis of the high molecular weight high functionality plant oil polyol, according to the invention, may be conducted in the presence of a solvent system or in a solvent-free system. In some embodiments, wherein a solvent system is used, the solvent is toluene or benzene, the reaction temperature is boiling temperature or higher, and the reaction time is dependent upon the catalyst used. It is noted that the solvent solubilizes all of the reagents. In other embodiments, including but not limited to when a solvent-free system is used, the reaction temperature is between about 50° C. and about 200° C. or higher, wherein the reaction time is dependent upon the catalyst used and the reaction temperature. As is known in the art, many reactions proceed more rapidly at increased temperatures. Similarly, a given reaction may proceed more rapidly in the presence of a first catalyst than in the presence of a second catalyst. The reaction conditions selected for use may be optimized for the price and availability of reaction components and the reaction product to be produced.

The molecular weight of the natural oil polyols of the present intention may be adjusted by increasing or decreasing the amount of coupling reagent used in the reaction. Increasing the amount of coupling reagent is associated with an increase in the molecular weight of the natural oil polyol reaction product. Decreasing the amount of coupling reagent is associated with a decrease in the molecular weight of the natural oil polyol reaction product.

The functionality of the natural oil polyols of the present intention can be adjusted by increasing or decreasing the concentration of the cross-linker used in the reaction. For example, increasing the concentration of the cross-linker in the reaction is associated with an increase in the functionality of the natural oil polyol reaction product. Decreasing the concentration of the cross-linker in the reaction is associated with a decrease in the functionality of the natural oil polyol reaction product. This has been demonstrated in the laboratory using a natural oil monofunctional alcohol instead of soybean oil, in the reaction of scheme II. The results of these experiments are shown in the Table 1 below:

TABLE 1

| f (CL1) | f (CL2) | Ratio of [CL1]:[CL2] | Avg f (polyol) |
|---|---|---|---|
| 4 | — | — | 4 |
| 4 | 6 | 1:1 | 5 |
| 6 | — | — | 6 |
| 6 | 8 | 1:1 | 7 |
| 8 | — | — | 8 |

With reference to Table 1, the letter "f" refers to functionality; CL1 refers to cross-linker 1, CL2 refers to cross-linker 2, square brackets [ ] denote concentration, and Avg f is the average functionality of the polyol reaction product.

Though Table 1 shows reaction product polyols with an average functionality of 7, the method of the present invention can yield reaction product polyols having functionalities greater than or less than those shown in the Table 1 above. These reaction product polyols have both high functionality and high molecular weight, having equivalent weights equal to direct addition soy polyols may be prior methods, such as shown in Table 2 below:

TABLE 2

| Method | Avg f (polyol) | Equivalent Weight |
|---|---|---|
| Prior Methods | 3 | 1200 g/mol |
| Present Invention | 7 | 1300 g/mol |

The formulations containing high (>30% w/v) of the polyols of the present intention made excellent flexible polyurethane foams. In general, the natural oil polyols of the present invention can be cured with aromatic isocyanates, aliphatic isocyanates, and isocyanate terminated pre-polymers to form polyurethanes. The physical properties of polyurethane made from the natural plant oil polyols of the present invention are dependent on the polyols, the formulation and the isocyanate used to made the polyurethane.

The following examples of compositions according to the invention are provided for illustration. Any parts and percentages are by weight of the composition unless otherwise indicated.

Example 19

| Component | Amount (grams) |
|---|---|
| Soybean oil | 459.51 |
| Iodine | 0.81 |
| Diethanolamine | 49.66 |
| Maleic anhydride | 70.74 |
| Sorbitol | 18.77 |
| Sulfuric acid | 0.51 |
| Petrol-based polyether polyols | 102.22 |
| Water | 5.61 |
| Surfactant | 1.75 |
| Amine Catalysts | 1.65 |
| TDI | 40.11 |
| Polymeric MDI | 10.03 |

The above amounts of diethanolamine and iodine were added to the above amount of soybean oil with stirring. The mixture was stirred for 24 hours at a temperature between about 100° C. and about 105° C. to produce a first reaction product. Then 118.60 grams of the first reaction product was reacted with a mixture of the above amounts of maleic anhydride, sorbitol and sulfuric acid at a temperature of about 125° C. for about 52 minutes to give a second reaction product. All of the second reaction product was mixed with the remaining portion of the first reaction product, and was stirred for 71 hours at a temperature of about 120° C. and about 125° C. under vacuum to give a clear liquid soybean oil-polyol with a hydroxyl number of 52. An amount of 43.81 grams of the soybean oil-polyol was then reacted with the above disclosed amounts of petrol-based polyether polyols, water, surfactant, amine catalysts, followed by reaction with the above disclosed amounts of TDI and polymeric MDI to yielding a flexible soybean oil-based polyurethane foam with a density of 2.5 pounds.

Example 20

| Component | Amount (grams) |
| --- | --- |
| Soybean oil | 200.65 |
| Iodine | 0.35 |
| Diethanolamine | 21.68 |
| Maleic anhydride | 23.22 |
| Poly-G® 540-555 | 11.04 |
| Sulfuric acid | 0.23 |
| Toluene | 243.00 |
| Diphenylmethane diisocyanate | 2.10 |

The above amounts of diethanolamine and iodine were added to the above amount of soybean oil with stirring. The mixture was stirred for 24 hours at a temperature between about 100° C. and about 105° C. to produce a first reaction product. Separately, the above amounts of Poly-G® 540-555 cross-linker, maleic anhydride, sulfuric acid and toluene were reacted for 1 hour at 60° C. to give a second reaction product. Then all of the first and second reaction products were mixed and refluxed over a Dean-Stark receiver for 20 hours, followed by distillation of the toluene to give a clear liquid soybean oil-polyol with a hydroxyl number of 55. An amount of 15.00 grams of the soybean oil-polyol was then reacted with the above amount of diphenylmethane diisocyanate to yielding a solid soybean oil-based polyurethane material.

Example 21

| Component | Amount (grams) |
| --- | --- |
| Soybean oil | 443.56 |
| Iodine | 0.78 |
| Diethanolamine | 47.91 |
| Maleic anhydride | 68.29 |
| Sorbitol | 9.18 |
| Poly-G® 540-555 | 24.79 |
| Sulfuric acid | 0.52 |
| Petrol-based polyether polyols | 97.43 |
| Water | 5.34 |
| Surfactant | 1.67 |
| Amine Catalysts | 1.58 |
| TDI | 38.23 |
| Polymeric MDI | 9.56 |

The above amounts of diethanolamine and iodine were added to the above amount of soybean oil with stirring. The mixture was stirred for 25 hours at a temperature between about 95° C. and about 105° C. to produce a first reaction product. Then 114.48 grams of the first reaction product was reacted with a mixture of the above amounts of maleic anhydride, Poly-G® 540-555, sorbitol and sulfuric acid at a temperature between about 105° C. and about 116° C. for about 3 hours to give a second reaction product. All of the second reaction product was mixed with the remaining portion of the first reaction product, and was stirred for 64 hours at a temperature of about 120° C. and about 125° C. under vacuum to give a clear liquid soybean oil-polyol with a hydroxyl number of 48. An amount of 41.75 grams of the soybean oil-polyol was then mixed with the above disclosed amounts of petrol-based polyether polyols, water, surfactant, amine catalysts, followed by reaction with the above disclosed amounts of TDI and polymeric MDI to yielding a flexible soybean oil-based polyurethane foam with a density of 2.4 pounds.

Example 22

| Component | Amount (grams) |
| --- | --- |
| Soybean oil | 236.81 |
| Iodine | 0.41 |
| Diethanolamine | 25.59 |
| Maleic anhydride | 36.46 |
| Toluene | 283.00 |
| Sorbitol | 6.45 |
| Poly-G® 540-555 | 8.91 |
| Sulfuric acid | 0.28 |
| Petrol-based polyether polyols | 64.95 |
| Water | 3.56 |
| Surfactant | 1.11 |
| Amine Catalysts | 1.05 |
| TDI | 25.49 |
| Polymeric MDI | 6.37 |

The above amounts of diethanolamine and iodine were added to the above amount of soybean oil with stirring. The mixture was stirred for 21 hours at a temperature between about 90° C. and about 106° C. Then, the above amounts of toluene, maleic anhydride, Poly-G®, 540-555, sorbitol and sulfuric acid were added and the mixture was refluxed over a Dean-Stark receiver for 20 hours. The toluene was distilled out to give a clear liquid soybean oil-polyol with a hydroxyl number of 51. An amount of 27.84 grams of the soybean oil-polyol was then mixed with the above disclosed amounts of petrol-based polyether polyols, water, surfactant, amine catalysts, followed by reaction with the above disclosed amounts of TDI and polymeric MDI to yielding a flexible soybean oil-based polyurethane foam with a density of 2.6 pounds.

Example 23

| Component | Amount (grams) |
| --- | --- |
| Soybean oil | 272.87 |
| Iodine | 0.48 |
| Diethanolamine | 29.49 |
| Maleic anhydride | 42.01 |
| Toluene | 326.00 |
| Sorbitol | 3.72 |
| Poly-G® 540-555 | 24.72 |
| Phosphoric acid | 0.33 |
| Petrol-based polyether polyols | 55.67 |
| Water | 3.56 |
| Surfactant | 1.11 |
| Amine Catalysts | 1.05 |
| TDI | 25.62 |
| Polymeric MDI | 6.40 |

The above amounts of diethanolamine and iodine were added to the above amount of soybean oil with stirring. The mixture was stirred for 22 hours at a temperature between about 95° C. and about 105° C. Then, the above amounts of toluene, maleic anhydride, Poly-G® 540-555, sorbitol and phosphoric acid were added and the mixture was refluxed over a Dean-Stark receiver for 20 hours. The toluene was distilled out to give a clear liquid soybean oil-polyol with a hydroxyl number of 48. An amount of 37.12 grams of the soybean oil-polyol was then mixed with the above disclosed amounts of petrol-based polyether polyols, water, surfactant, amine catalysts, followed by reaction with the above disclosed amounts of TDI and polymeric MDI to yielding a flexible soybean oil-based polyurethane foam with a density of 2.7 pounds.

Example 24

| Component | Amount (grams) |
| --- | --- |
| Soybean oil | 456.20 |
| Iodine | 0.80 |
| Diethanolamine | 49.30 |
| Maleic anhydride | 74.25 |
| Sorbitol | 18.64 |
| Phosphoric acid | 0.82 |
| Petrol-based polyether polyols | 90.00 |
| Water | 5.76 |
| Surfactant | 1.80 |
| Amine Catalysts | 1.70 |
| TDI | 41.51 |
| Polymeric MDI | 10.38 |

The above amounts of diethanolamine and iodine were added to the above amount of soybean oil with stirring. The mixture was stirred for 24 hours at a temperature between about 100° C. and about 105° C. to produce a first reaction product. Then 117.74 grams of the first reaction product was reacted with a mixture of the above amounts of maleic anhydride, sorbitol and phosphoric acid at a temperature of about 125° C. for about 50 minutes, while stirring, to give a second reaction product. All of the second reaction product was mixed with the remaining portion of the first reaction product, and was stirred for 60 hours at a temperature of between about 122° C. and about 126° C. under vacuum to give a clear liquid soybean oil-polyol with a hydroxyl number of 46. An amount of 60.00 grams of the soybean oil-polyol was then mixed with the above disclosed amounts of petrol-based polyether polyols, water, surfactant, amine catalysts, followed by reaction with the above disclosed amounts of TDI and polymeric MDI to yielding a flexible soybean oil-based polyurethane foam with a density of 2.3 pounds.

Example 25

| Component | Amount (grams) |
| --- | --- |
| Soybean oil | 239.84 |
| Iodine | 0.42 |
| Diethanolamine | 25.92 |
| Maleic anhydride | 19.36 |
| Toluene | 287.00 |
| Sorbitol | 9.80 |
| p-Toluenesulfonic acid | 0.43 |
| Petrol-based polyether polyols | 90.00 |
| Water | 5.76 |
| Surfactant | 1.80 |
| Amine Catalysts | 1.70 |
| TDI | 42.31 |
| Polymeric MDI | 10.58 |

The above amounts of diethanolamine and iodine were added to the above amount of soybean oil with stirring. The mixture was stirred for 22 hours at a temperature of about 105° C. Then, the above amounts of toluene, maleic anhydride, sorbitol and p-toluenesulfonic acid were added and the mixture was refluxed over a Dean-Stark receiver for 22 hours. The toluene was distilled out to give a clear liquid soybean oil-polyol with a hydroxyl number of 56. An amount of 60.00 grams of the soybean oil-polyol was then mixed with the above disclosed amounts of petrol-based polyether polyols, water, surfactant, amine catalysts, followed by reaction with the above disclosed amounts of TDI and polymeric MDI to yielding a flexible soybean oil-based polyurethane foam with a density of 2.5 pounds.

Example 26

| Component | Amount (grams) |
| --- | --- |
| Soybean oil | 231.53 |
| Iodine | 0.41 |
| Diethanolamine | 25.02 |
| Maleic anhydride | 17.11 |
| Toluene | 276.00 |
| Sorbitol | 3.72 |
| Poly-G ® 540-555 | 26.22 |
| Sulfuric acid | 0.42 |
| Petrol-based polyether polyols | 82.50 |
| Water | 5.28 |
| Surfactant | 1.65 |
| Amine Catalysts | 1.56 |
| TDI | 38.78 |
| Polymeric MDI | 9.70 |

The above amounts of diethanolamine and iodine were added to the above amount of soybean oil with stirring. The mixture was stirred for 20 hours at a temperature of about 106° C. Then, the above amounts of toluene, maleic anhydride, Poly-G® 540-555, sorbitol and sulfuric acid were added and the mixture was refluxed over a Dean-Stark receiver for 20 hours. The toluene was distilled out to give a clear liquid soybean oil-polyol with a hydroxyl number of 57. An amount of 55.00 grams of the soybean oil-polyol was then mixed with the above disclosed amounts of petrol-based polyether polyols, water, surfactant, amine catalysts, followed by reaction with the above disclosed amounts of TDI and polymeric MDI to yielding a flexible soybean oil-based polyurethane foam with a density of 2.6 pounds.

Example 27

| Component | Amount (grams) |
| --- | --- |
| Soybean oil | 459.56 |
| Iodine | 0.81 |
| Diethanolamine | 49.66 |
| Maleic anhydride | 69.54 |
| Sorbitol | 9.51 |
| Pentaerythritol | 8.66 |
| Sulfuric acid | 0.54 |
| Petrol-based polyether polyols | 90.93 |
| Water | 4.99 |
| Surfactant | 1.56 |
| Amine Catalysts | 1.47 |
| TDI | 35.68 |
| Polymeric MDI | 8.92 |

The above amounts of diethanolamine and iodine were added to the above amount of soybean oil with stirring. The mixture was stirred for 23 hours at a temperature between about 100° C. and about 105° C. to produce a first reaction product. Then 118.61 grams of the first reaction product was reacted with a mixture of the above amounts of maleic anhydride, sorbitol, pentaerythritol and sulfuric acid at a temperature between about 105° C. and about 116° C. for about 3 hours to give a second reaction product. All of the second reaction product was mixed with the remaining portion of the first reaction product, and was stirred for 60 hours at a temperature of about 121° C. and about 127° C. under vacuum to give a clear liquid soybean oil-polyol with a hydroxyl number of 50. An amount of 38.97 grams of the soybean oil-polyol was then mixed with the above disclosed amounts of petrol-based polyether polyols, water, surfactant, amine catalysts, followed by reaction with the above disclosed amounts of TDI and polymeric MDI to yielding a flexible soybean oil-based polyurethane foam with a density of 2.5 pounds.

Example 28

| Component | Amount (grams) |
| --- | --- |
| Soybean oil | 440.41 |
| Iodine | 0.77 |
| Diethanolamine | 47.59 |
| Maleic anhydride | 72.06 |
| Sorbitol | 9.12 |
| Poly-G ® 540-555 | 24.61 |
| Phosphoric acid | 0.51 |
| Petrol-based polyether polyols | 83.51 |
| Water | 5.34 |
| Surfactant | 1.67 |
| Amine Catalysts | 1.58 |
| TDI | 38.14 |
| Polymeric MDI | 9.54 |

The above amounts of diethanolamine and iodine were added to the above amount of soybean oil with stirring. The mixture was stirred for 24 hours at a temperature between about 100° C. and about 105° C. to produce a first reaction product. Then 113.67 grams of the first reaction product was reacted with a mixture of the above amounts of maleic anhydride, sorbitol, Poly-G® 540-555 and phosphoric acid at a temperature between about 110° C. and about 115° C. for about 3 hours to give a second reaction product. All of the second reaction product was mixed with the remaining portion of the first reaction product, and was stirred for 68 hours at a temperature of about 120° C. and about 125° C. under vacuum to give a clear liquid soybean oil-polyol with a hydroxyl number of 41. An amount of 55.67 grams of the soybean oil-polyol was then mixed with the above disclosed amounts of petrol-based polyether polyols, water, surfactant, amine catalysts, followed by reaction with the above disclosed amounts of TDI and polymeric MDI to yielding a flexible soybean oil-based polyurethane foam with a density of 2.7 pounds.

Example 29

| Component | Amount (grams) |
| --- | --- |
| Soybean oil | 292.83 |
| Iodine | 0.51 |
| Diethanolamine | 31.64 |
| Maleic anhydride | 36.92 |
| Toluene | 335.00 |
| Sorbitol | 3.05 |
| Sulfuric acid | 0.33 |
| Petrol-based polyether polyols | 37.12 |
| Water | 3.56 |
| Surfactant | 1.11 |
| Amine Catalysts | 1.05 |
| TDI | 25.62 |
| Polymeric MDI | 6.40 |

The above amounts of diethanolamine and iodine were added to the above amount of soybean oil with stirring. The mixture was stirred for 22 hours at a temperature of between about 100° C. and about 105° C. Then, the above amounts of toluene, maleic anhydride, sorbitol and sulfuric acid were added and the mixture was refluxed over a Dean-Stark receiver for 32 hours. The toluene was distilled out to give a clear liquid soybean oil-polyol with a hydroxyl number of 39. An amount of 55.67 grams of the soybean oil-polyol was then mixed with the above disclosed amounts of petrol-based polyether polyols, water, surfactant, amine catalysts, followed by reaction with the above disclosed amounts of TDI and polymeric MDI to yielding a flexible soybean oil-based polyurethane foam with a density of 2.4 pounds.

Example 30

| Component | Amount (grams) |
| --- | --- |
| Soybean oil | 390.89 |
| Iodine | 0.68 |
| Diethanolamine | 42.24 |
| Maleic anhydride | 51.58 |
| Poly-G ® 540-555 | 14.17 |
| Sulfuric acid | 0.43 |
| Petrol-based polyether polyols | 46.39 |
| Water | 3.56 |
| Surfactant | 1.11 |
| Amine Catalysts | 1.05 |
| TDI | 24.91 |
| Polymeric MDI | 6.23 |

The above amounts of diethanolamine and iodine were added to the above amount of soybean oil with stirring. The mixture was stirred for 24 hours at a temperature of between about 95° C. and about 105° C. Then 100.89 grams of the first reaction product was reacted with a mixture of the above amounts of maleic anhydride, Poly-G® 540-555 and sulfuric acid at a temperature between about 66° C. and about 77° C. for about 2 hours to give a second reaction product. All of the second reaction product was mixed with the remaining portion of the first reaction product, and was stirred for 78 hours at a temperature of between about 116° C. and about 124° C. under vacuum to give a clear liquid soybean oil-polyol with a hydroxyl number of 32. An amount of 46.39 grams of the soybean oil-polyol was then mixed with the above disclosed amounts of petrol-based polyether polyols, water, surfactant, amine catalysts, followed by reaction with the above disclosed amounts of TDI and polymeric MDI to yielding a flexible soybean oil-based polyurethane foam with a density of 2.5 pounds.

Example 31

| Component | Amount (grams) |
|---|---|
| Soybean oil | 289.62 |
| Iodine | 0.51 |
| Diethanolamine | 31.30 |
| Maleic anhydride | 37.01 |
| Toluene | 331.00 |
| Poly-G ® 540-555 | 10.03 |
| Phosphoric acid | 0.50 |
| Petrol-based polyether polyols | 46.39 |
| Water | 3.56 |
| Surfactant | 1.11 |
| Amine Catalysts | 1.05 |
| TDI | 25.03 |
| Polymeric MDI | 6.26 |

The above amounts of diethanolamine and iodine were added to the above amount of soybean oil with stirring. The mixture was stirred for 23 hours at a temperature of between about 95° C. and about 105° C. Then, the above amounts of toluene, maleic anhydride, Poly-G® 540-555 and phosphoric acid were added and the mixture was refluxed over a Dean-Stark receiver for 38 hours. The toluene was distilled out to give a clear liquid soybean oil-polyol with a hydroxyl number of 34. An amount of 46.39 grams of the soybean oil-polyol was then mixed with the above disclosed amounts of petrol-based polyether polyols, water, surfactant, amine catalysts, followed by reaction with the above disclosed amounts of TDI and polymeric MDI to yielding a flexible soybean oil-based polyurethane foam with a density of 2.5 pounds.

Example 32

| Component | Amount (grams) |
|---|---|
| Soybean oil | 399.64 |
| Iodine | 0.70 |
| Diethanolamine | 43.18 |
| Maleic anhydride | 51.68 |
| Sorbitol | 4.35 |
| Sulfuric acid | 0.44 |
| Petrol-based polyether polyols | 46.39 |
| Water | 3.56 |
| Surfactant | 1.11 |
| Amine Catalysts | 1.05 |
| TDI | 25.15 |
| Polymeric MDI | 6.29 |

The above amounts of diethanolamine and iodine were added to the above amount of soybean oil with stirring. The mixture was stirred for 24 hours at a temperature of between about 100° C. and about 105° C. Then 103.14 grams of the first reaction product was reacted with a mixture of the above amounts of maleic anhydride, sorbitol and sulfuric acid at a temperature between about 66° C. and about 77° C. for about 2 hours to give a second reaction product. All of the second reaction product was mixed with the remaining portion of the first reaction product, and was stirred for 78 hours at a temperature of between about 120° C. and about 125° C. under vacuum to give a clear liquid soybean oil-polyol with a hydroxyl number of 36. An amount of 46.39 gram's of the soybean oil-polyol was then mixed with the above disclosed amounts of petrol-based polyether polyols, water, surfactant, amine catalysts, followed by reaction with the above disclosed amounts of TDI and polymeric MDI to yielding a flexible soybean oil-based polyurethane foam with a density of 2.6 pounds.

Example 33

| Component | Amount (grams) |
|---|---|
| Soybean oil | 401.89 |
| Iodine | 0.70 |
| Diethanolamine | 43.43 |
| Maleic anhydride | 49.85 |
| Sorbitol | 3.28 |
| Phosphoric acid | 0.84 |
| Petrol-based polyether polyols | 37.12 |
| Water | 3.56 |
| Surfactant | 1.11 |
| Amine Catalysts | 1.05 |
| TDI | 25.43 |
| Polymeric MDI | 6.36 |

The above amounts of diethanolamine and iodine were added to the above amount of soybean oil with stirring. The mixture was stirred for 24 hours at a temperature of between about 100° C. and about 105° C. Then 103.73 grams of the first reaction product was reacted with a mixture of the above amounts of maleic anhydride, sorbitol and phosphoric acid at a temperature of about 77° C. for about 2 hours to give a second reaction product. All of the second reaction product was mixed with the remaining portion of the first reaction product, and was stirred for 82 hours at a temperature of between about 124° C. and about 129° C. under vacuum to give a clear liquid soybean oil-polyol with a hydroxyl number of 38. An amount of 55.67 grams of the soybean oil-polyol was then mixed with the above disclosed amounts of petrol-based polyether polyols, water, surfactant, amine catalysts, followed by reaction with the above disclosed amounts of TDI and polymeric MDI to yielding a flexible soybean oil-based polyurethane foam with a density of 2.5 pounds.

The above description discloses several methods and materials of the present invention. Variations of the methods and materials, as well as alterations in the equipment may be utilized in accordance with the invention and the described examples are not intended to limit the scope of the invention. Such variations will become apparent to those skilled in the art from a consideration of this disclosure or practice of the invention disclosed herein. Consequently, it is not intended that this invention be limited to the specific embodiments disclosed herein, but that it cover all variations, modifications and alternatives coming within the true scope and spirit of the invention. It is to be understood that while certain forms of the present invention have been illustrated and described herein, it is not to be limited to the specific forms or configuration of equipment described and shown.

All references cited herein, including but not limited to published and unpublished applications, patents, and literature references, are incorporated herein by reference in their entirety and are hereby made a part of this specification. To the extent publications and patents or patent applications incorporated by reference contradict the disclosure contained in the specification, the specification is intended to supersede and/or take precedence over any such contradictory material.

What is claimed and desired to be secured by Letters Patent is as follows:

1. A process of synthesizing a high molecular weight high functionality natural oil polyol, the process comprising:

a) providing a quantity of a small molecular weight polyfunctional cross-linking reagent containing at least four active hydrogen functional groups;

b) providing a quantity of a coupling reagent selected from the group consisting of linear coupling reagents, cross-coupling reagents, and combinations thereof;

c) forming a mixture including a quantity of a plant oil based unsaturated triglyceride, the quantity of the cross-linking reagent, the quantity of the coupling reagent, and an acid catalyst; and d) reacting the mixture for a period of time of at least three hours; wherein e) the quantity of the coupling reagent is sufficient to provide a final coupling reagent concentration in the reaction, wherein the final coupling reagent concentration is sufficient to synthesize a plant oil based polyol product having a pre-determined molecular weight of between about 2,000 and about 20,000; and f) the quantity of the cross-linking reagent is sufficient to provide a final cross-linking reagent concentration in the reaction, wherein the final cross-linking reagent concentration is sufficient to synthesize a plant oil based polyol product having a pre-determined functionality of from 4 to 8.

2. The process of claim 1, wherein reacting the mixture includes reacting the mixture in a solvent system.

3. The process of claim 2, wherein reacting the mixture in a solvent system includes reacting the mixture in a solvent selected from the group consisting of benzene, toluene and combinations thereof.

4. The process of claim 2, wherein reacting the mixture in a solvent system includes reacting the mixture at a temperature of at least boiling temperature.

5. The process of claim 1, wherein reacting the mixture includes reacting the mixture in a solvent-free system.

6. The process of claim 5, wherein reacting the mixture in a solvent-free system includes reacting the mixture in the presence of a vacuum.

7. The process of claim 5, wherein reacting the mixture in a solvent-free system includes reacting the mixture at a temperature selected from the group consisting of between about 50° C. and about 225° C.

8. The process of claim 5, wherein reacting the mixture in a solvent-free system includes reacting the mixture at a temperature selected from the group consisting of 50° C., 75° C., 80° C., 85° C., 90° C., 95° C., 100° C., 105° C., 110° C., 115° C., 120° C., 125° C., 130° C., 135° C., 140° C., 145° C., 150° C., 155° C., 160° C., 165° C., 170° C., 175° C., 180° C., 185° C., 190° C., 195° C., 200° C., 205° C., 210° C., 215° C., 220° C. and 225° C.

9. The process of claim 1, wherein reacting the mixture for a period of time includes reacting the mixture for a period of time of between about 3-hours and about 80-hours.

10. The process of claim 1, wherein the linear coupling reagent is selected from the group consisting of dicarboxylic acids, dicarboxylic anhydrides, and combinations thereof.

11. The process of claim 1, wherein the cross-coupling reagent is selected from the group consisting of tricarboxylic acids, tetracarboxylic acids, tetracarboxylic dianhydrides, and combinations thereof.

12. The process of claim 1, wherein the coupling reagent is selected from the group consisting of maleic acid, maleic anhydride, succinic acid, succinic anhydride, glutaric acid, glutaric anhydride, phthalic acid, phthalic anhydride, fumaric acid, pimelic acid, suberic acid, azelaic acid, sebacic acid, isophthalic acid, terephthalic acid, traumatic acid, muconic acid, adipic acid, tricarboxylic acid, citric acid, aconitic acid, carballylic acid, trimesic acid, 1,1,2,3-ethanetetracarboxylic acid, 1,2,3,4-propanetetracarboxylic acid, 1,1,4,4-butanetetracarboxylic acid, 1,2,3,4-butanetetracarboxylic acid, 1,2,3,4-butanetetracarboxylic dianhydride, 1,2,4,5-tetracarboxybenzene, 1,2,3,5-tetracarboxybenzene, 1,2,4,5-tetracarboxybenzene, benzene-1,2,4,5-tetracarboxylic dianhydride, 1,4,5,8-naphthalenetetracarboxylic dianhydride and combinations thereof.

13. The process of claim 1, wherein the cross-linker reagent is selected from the group consisting of polyols, polythiols, and polyamines containing 4, 5, 6, and 8 active hydrogen functional groups, and a combination thereof.

14. The process of claim 1, wherein the cross-linker reagent is selected from the group consisting of pentaerythritol, pentaerythritol propoxylate, pentaerythritol ethoxylate, pentaerythritol tetrakis(3-mercaptopropionate), arabinose, arabitol, dipentaerythritol, sorbitol, β-lactose, D-lactitol, matitol, and combinations thereof.

15. The process of claim 1, wherein the catalyst is selected from the group consisting of organic acids and inorganic acids, and combinations thereof.

16. The process of claim 1, wherein the catalyst is selected from the group consisting of p-toluenesulfonic acid, methanesulfonic acid, sulfuric acid and phosphoric acid, and combinations thereof.

17. The process of claim 1, wherein the plant oil based triglyceride is selected from the group consisting of a corn oil, soybean oil, rapeseed oil, sunflower oil, sesame seed oil, peanut oil, safflower oil, olive oil, cotton seed oil, linseed oil, walnut oil, tung oil and combinations thereof.

18. The process of claim 1, wherein the plant oil based triglyceride is a soybean oil based triglyceride.

19. A high molecular weight high functionality plant oil based polyol according to claim 1.

20. The polyol of claim 19, wherein the polyol is a soybean oil based polyol.

21. A process of preparing a polyurethane comprising the steps of:

a) reacting at least one high molecular weight high functionality plant oil based polyol of claim 1 with at least one of an aromatic isocyanate, an aliphatic isocyanate and an isocyanate terminated pre-polymer, so as to form a polyurethane.

22. A polyurethane according to the process of claim 21.

23. The process of claim 1, wherein:

a) the hydroxyl number of the plant oil based polyol product is one of 32, 34, 36, 38, 39, 41, 50, 51, 52, 53, 54, 55, 56, 57, 58, 59 and 60.

24. The process of claim 1, wherein:

a) the average functionality of the polyol product is 7.

* * * * *